United States Patent [19]
Kishi et al.

[11] Patent Number: 4,635,185
[45] Date of Patent: Jan. 6, 1987

[54] MACHINING AREA SPECIFYING METHOD FOR AN AUTOMATIC PROGRAMMING SYSTEM

[75] Inventors: Hajimu Kishi; Kunio Tanaka; Takashi Takegahara, all of Tokyo, Japan

[73] Assignee: Fanuc Ltd., Minamitsuru, Japan

[21] Appl. No.: 680,252

[22] PCT Filed: Mar. 27, 1984

[86] PCT No.: PCT/JP84/00136
§ 371 Date: Nov. 28, 1984
§ 102(e) Date: Nov. 28, 1984

[87] PCT Pub. No.: WO84/03958
PCT Pub. Date: Oct. 11, 1984

[30] Foreign Application Priority Data
Mar. 28, 1983 [JP] Japan .................................. 58-052018

[51] Int. Cl.⁴ .................... G06F 15/46; G05B 19/18
[52] U.S. Cl. .................................... 364/191; 340/709;
364/171; 364/474; 318/568
[58] Field of Search .................... 364/167–171,
364/188, 189, 191–193, 474, 475; 318/568;
340/706, 707, 708, 709

[56] References Cited
U.S. PATENT DOCUMENTS

| | | | |
|---|---|---|---|
| 3,757,095 | 9/1973 | Kiwiet | 364/171 X |
| 4,490,781 | 12/1984 | Kishi et al. | 364/171 X |
| 4,495,491 | 1/1985 | Postl | 340/709 |
| 4,530,046 | 7/1985 | Munekata et al. | 364/171 X |
| 4,530,061 | 7/1985 | Henderson et al. | 364/475 |

*Primary Examiner*—Joseph Ruggiero
*Attorney, Agent, or Firm*—Staas & Halsey

[57] ABSTRACT

A machining area specifying method for an automatic programming system specifies a partial path to be machined, wherein the path is part of a closed path. The machining area specifying method includes the step of displaying a closed path trajectory form by a number of path blocks ($b_1, b_2 \ldots b_{16}$) on a display screen (105) by using path data prepared beforehand. First and second points ($P_5, P_{12}$) on the closed path are entered by designating the points with a cursor (CSR). A point ($P_6$) on a first path ($P_5 \rightarrow P_6 \rightarrow \ldots P_{12}$) and a point ($P_{13}$) on a second path which are connected to the first and second points, are designated by the cursor. An area to be machined is specified by operating a machining area input switch when the first path is being designated by the cursor in a case where the first path is to be machined, while the machining area input switch is operated when the second path is being designated by the cursor in a case where the second path is to be machined.

6 Claims, 5 Drawing Figures

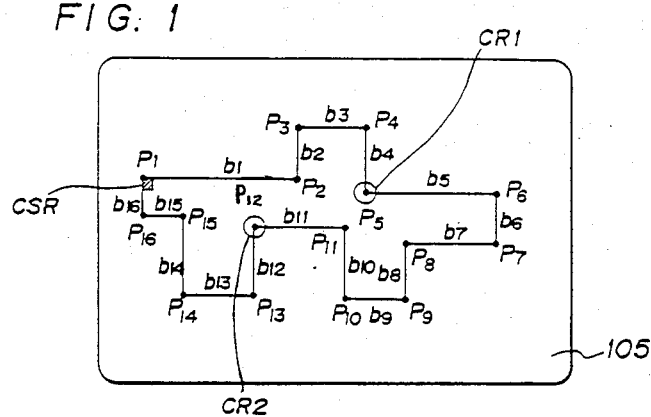
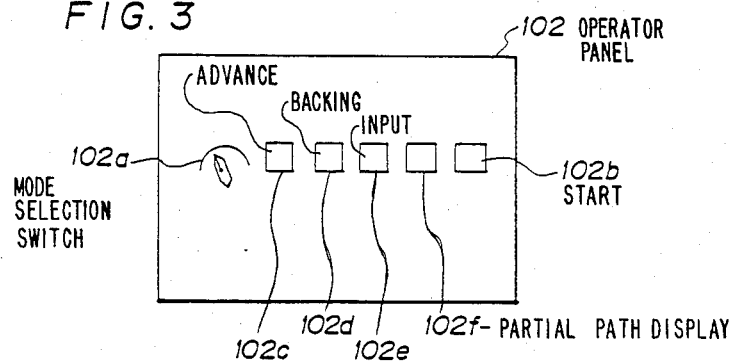
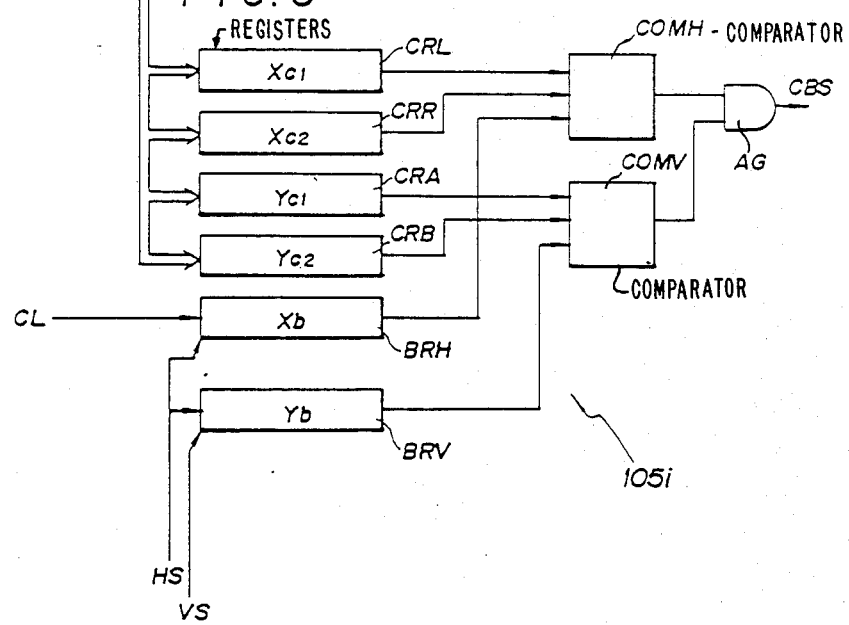

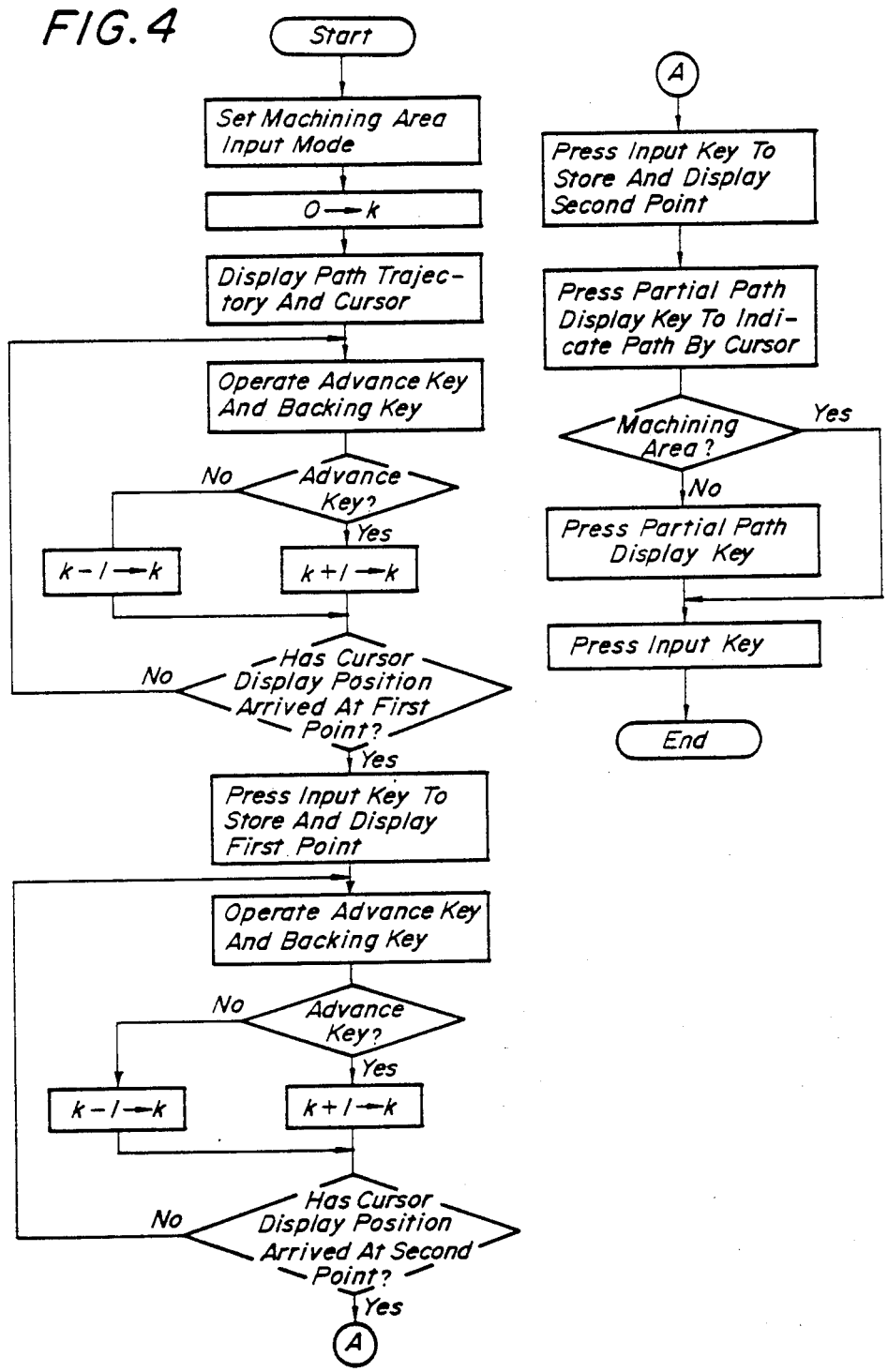

MACHINING AREA SPECIFYING METHOD FOR AN AUTOMATIC PROGRAMMING SYSTEM

CROSS-REFERENCE TO RELATED APPLICATION

This application is related to my U.S. application Ser. No. 682,008, filed Nov. 28, 1984.

BACKGROUND OF THE INVENTION

This invention relates to a machining area specifying method for an automatic programming system for creating an NC tape (NC data). More specifically, the invention relates to a machining area specifying method well-suited for application when specifying a portion of a closed path.

A variety of automatic programming units have recently been put into practical use for the purpose of creating NC tapes (NC data) in a simple manner. With these automatic programming units, path data specifying a path can be simply created.

There are cases where it is desired to partially machine solely a portion of a closed path created by automatic programming, or to machine a portion of the closed path under one set of machining conditions, and a remaining portion of the closed path upon changing the machining conditions thereof. Although it is necessary to specify a portion of the closed path in cases such as these, the specifying operation cannot be performed in a simple manner in the prior art.

SUMMARY OF THE INVENTION

It is an object of the present invention to provide a machining area specifying method for an automatic programming system whereby a portion of a closed path can be specified through a simple operation.

Another object of the present invention is to provide a machining area specifying method for an automatic programming system whereby a closed path is displayed on a display screen so that a portion thereof can be specified.

Still another object of the present invention is to provide a machining area specifying method for an automatic programming system, wherein a cursor is movably displayed along a closed path which appears on a display screen, and a portion of the closed path is specified by the position at which the cursor is displayed.

The present invention provides a machining area specifying method which includes displaying a closed path trajectory comprising a number of path blocks on a display screen by using path data prepared beforehand, entering first and second points on the closed path, thereafter indicating by a cursor one of a point on a first path and a point on a second path which are connected to the first and second points, and specifying an area to be machined by operating a machining area input switch when the point on the first path is being indicated by the cursor in a case where the first path is to be machined, and operating the machining area input switch when the point on the second path is being indicated by the cursor in a case where the second path is to be machined.

BRIEF DESCRIPTION OF THE DRAWINGS

FIG. 1 is a diagram of a path trajectory;

FIG. 3 is a side view of an operator panel;

FIG. 4 is a flowchart for the processing performed by the processor 103 of FIG. 2; and FIG. 5 is a block diagram of the cursor pointer 105$i$ of FIG. 2.

DESCRIPTION OF THE PREFERRED EMBODIMENT

Figure 2:
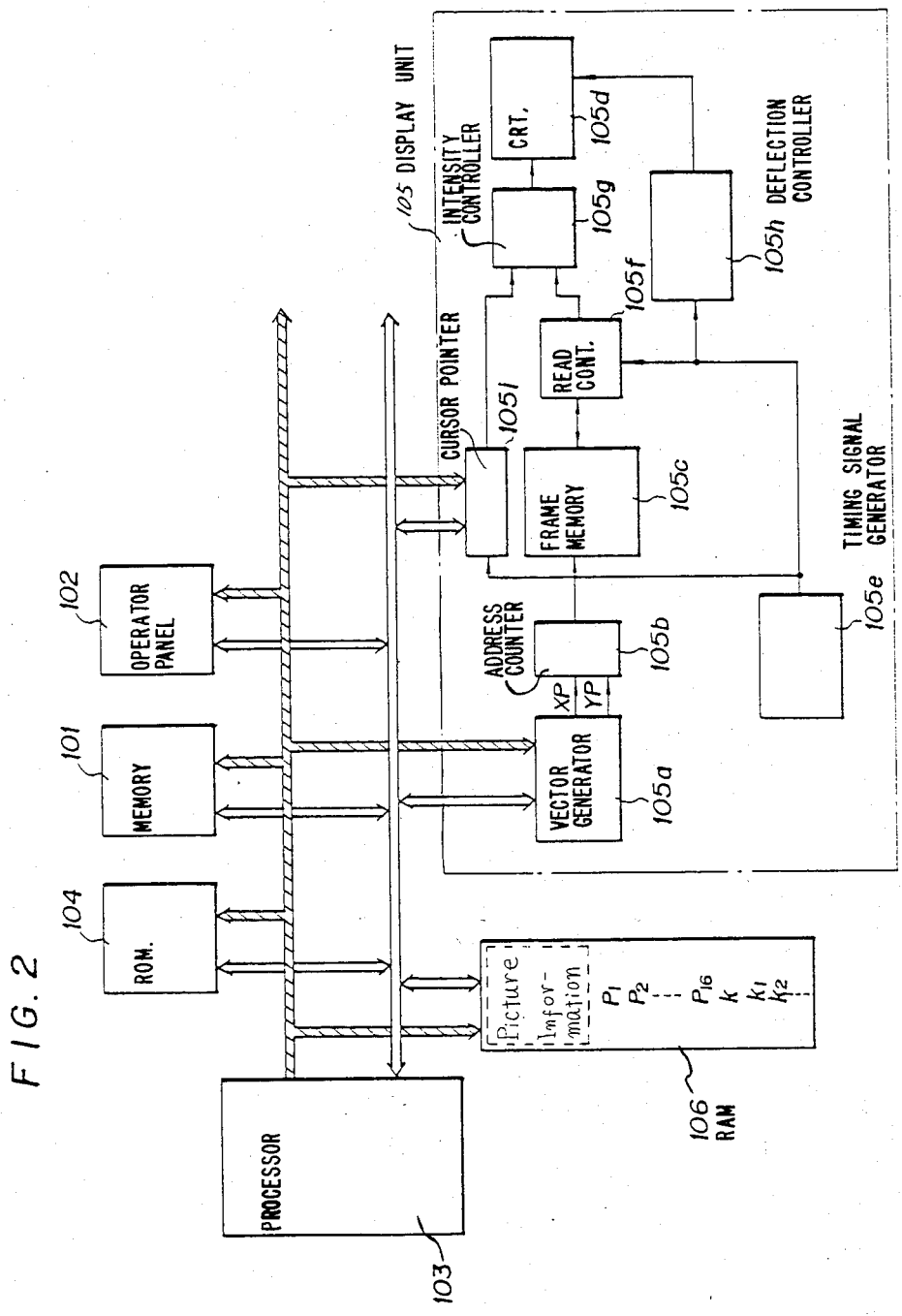
FIG. 2 is a block diagram of an embodiment of a circuit for carrying out the method of the present invention.

In FIG. 1, $P_1 \rightarrow P_2 \rightarrow P_3 \ldots \rightarrow P_{16} \rightarrow P_1$ represents a closed path trajectory. The closed path trajectory is displayed on a display unit 105 by using path data previously created and stored in a memory 101 (FIG. 2).

When a mode selection switch 102$a$ (FIG. 3) on an operator panel 102 is set to a machining area input mode and a start button 102$b$ is pressed, a processor 103 executes processing for closed path trajectory display under the control of a control program stored in a ROM 104. Specifically, the processor 103 initializes a variable k to zero by the following operation:

$$0 \rightarrow k$$

Thereafter, the processor 103 reads path data out of the memory 101 one block at a time in successive fashion, converts the path data read into picture information which is then stored in a RAM 106, and then, following the conversion processing, applies the picture information (data indicating the distinction between straight lines and circular arcs, as well as starting points and end points, etc.) to a vector generator 105$a$ one item at a time. The vector generator 105$a$ uses the picture information input to perform an ordinary linear or circular interpolation calculation, thereby generating interpolated pulses XP, YP along the respective axes, which pulses are applied to an address counter 105$b$. The latter has two address counters, one for the X axis and the other for the Y axis. These count the interpolated pulses XP, YP along the respective axes and write a "1" into a storage location of a frame memory 105$c$ which is designated by the X and Y-axis address counters each time. The frame memory 105$c$ is of matrix construction and has one-bit storage locations corresponding to the pixel positions of the cathode-ray tube display screen. Each time an interpolation pulse is generated, a "1" is written into a storage location at a matrix cross point designated by the X and Y-axis address counters. When a path trajectory has been stored in the frame memory 105$c$ by the foregoing processing, the stored information is subsequently read out of the frame memory 105$c$ in synchronism with the vertical and horizontal deflection of the CRT beam (this is referred to as raster scanning), and intensity modulation is performed using the stored information to display the tool path trajectory on a cathode-ray tube 105$d$. It should be noted that a timing signal generator 105$e$ produces a timing signal for reading the stored information out of the frame memory 105$c$, and a timing signal (vertical and horizontal synchronizing signals) for deflecting the beam. A read controller 105$f$ reads the stored information out of the frame memory 105$c$ on the basis of the timing signal, and an intensity controller 105$g$ performs intensity modulation based on the stored information. A deflection controller 105$h$ deflects the beam horizontally and vertically on the basis of the timing signal. At the same time that the aforementioned path trajectory is generated, the positions of starting points $P_1$, $P_2$ ... $P_{16}$ of respective path blocks $b_1$, $b_2$ ... $b_{16}$ (FIG. 1) are stored successively in the RAM 106.

Next, the processor 103 reads a variable k stored in the RAM 106, reads the coordinate values $(X_{k+1}, Y_{k+1})$ of the starting point $P_{k+1}$ of a path block $b_{k+1}$ designated by (k+1) out of the RAM 106, and applies cursor display area data in accordance with the starting point $P_{k+1}$ to a cursor pointer 105i. Let us assume that the horizontal and vertical dimensions of the cursor are W. The cursor display area data in such case will be the position $X_{c1}$ $(=X_{k+1})$ of the left edge of the cursor, the position $X_{c2}(=X_{k+1}+W)$ of the right edge of the cursor, the position $Y_{c1}$ $(=Y_{k+1})$ of the upper edge of the cursor, and the position $Y_{c2}(=Y_{k+1}-W)$ of the lower edge of the cursor. Since the timing signal from the timing signal generator 105e is also applied to the cursor pointer 105i, the latter is capable of recognizing the beam position. Therefore, when the beam position arrives at the cursor display area on the cathode-ray tube, the address pointer 105i applies a cursor display signal to the intensity controller 105g to display the cursor.

FIG. 5 is a block diagram of the cursor pointer 105i. The left and right-edge positions $X_{c1}$, $X_{c2}$ of the cursor are stored in registers CRL, CRR, respectively, and the upper and lower-edge positions $Y_{c1}$, $Y_{c2}$ of the cursor are stored in registers CRA, CRB, respectively. A register BRH has its status cleared by a horizontal sychronizing signal HS and counts clock pulses CL following generation of the horizontal synchronizing signal to monitor the position $X_b$ of the beam in the horizontal direction. A register BRV has its status cleared by a vertical sychronizing signal VS and counts the number of horizontal sychronizing signals HS following generation of the vertical synchronizing signal, to monitor the position $Y_b$ of the beam in the vertical direction. A comparator COMH determines whether the following relation holds:

$$X_{c1} \leq X_b \leq X_{c2} \quad (1)$$

and a comparator COMV determines whether the following relation holds:

$$Y_{c1} \leq Y_b \leq Y_{c2} \quad (2)$$

When the relations (1), (2) hold, an AND gate AG produces a high-level cursor display signal CBS. Accordingly, the cursor pointer 105i produces the cursor display signal CBS during the time that the beam resides in the cursor display area, in response to which the cursor is displayed at the starting point $P_{k+1}$. The cursor pointer 105i produces the cursor display signal on and off with every n-frame scan, thereby causing the cursor to blink. In the case described hereinabove, cursor display area data are generated and the cursor display signal CBS is produced to display the cursor on the cathode-ray tube when the beam arrives at the cursor display area. It should be noted, however, that an arrangement is possible wherein a cursor pattern is read out of a character generator (not shown), the cursor pattern is stored at a predetermined location of a character frame memory (not shown) designated by the point $P_{k+1}$, and the stored information (cursor pattern) is read out of the character frame memory to display the cursor on the cathode-ray tube 105d.

Initially, the cursor indicates the point $P_1$ (FIG. 1). If we assume that the partial path which is to be machined is the portion of the closed path from point $P_5$ to point $P_{12}$ under these conditions, then an advance key 102c or backing key 102d on the operator panel 102 is pressed. If the advance key 102c is pressed, the processor 103 performs the arithmetic operation $$k+1 \rightarrow k$$

(where the initial value of k is zero)
If the backing key 102d is pressed, the processor 103 performs the arithmetic operation $$k-1 \rightarrow k$$

If we assume that the 102c is pressed, then the processor 103 will read the advance key starting point $P_2$ of the second path block out of the RAM 106 and, as set forth above, will apply the coordinate values to the cursor pointer 105i to blink the cursor at the position of the point $P_2$ on the cathode-ray tube.

Accordingly, if the advance key 102c is pressed a total of four times (k=4), the cursor will blink at the position of point $P_{k+1}(=P_5)$. If the input key 102e is now pressed, the processor 103 sets the current variable k(=4) to $k_1$, stores this in the RAM 106 and performs processing to surround the point $P_5$ with a circle symbol (○), as shown in FIG. 1. More specifically, the processor 103 provides the vector generator 105a with an input of picture information for generating a circle pattern which surrounds the point P5. When the picture information enters the vector generator 105a, the latter performs circular interpolation, the address counter 105b counts interpolated pulses along each axis, and the frame memory 105c has a "1" written into each position designated by the address counter in the manner described above, so that the circle pattern is stored.

Next, if the advance key 102c is pressed a total of seven times, then, in a manner similar to that set forth above, the position at which the cursor is displayed will move in the fashion $P_5 \rightarrow P_6 \rightarrow P_7 \rightarrow P_8 \rightarrow P_9 \rightarrow P_{10} \rightarrow P_{11} \rightarrow P_{12}$, so that the cursor will blink at the point $P_{12}$. If this is followed by pressing the input key 102e, the processor 103 sets the current variable k(=11) to $k_2$, stores this in the RAM 106 and performs display processing to surround the point P12 with a circle symbol (○), as shown in FIG. 1, in the manner described above.

If a partial path display key 102f is now pressed, the processor 103 reads $k_1(=4)$, reads position data indicative of the starting point $P_{k1+2}(=P_6)$ of the $(k_1+2)$th block out of the RAM 106 and, as described earlier, applies this to the cursor pointer 105i to blink the cursor at the position of the point $P_6$ on the cathode-ray tube. If, under these conditions, the partial path to be machined is $P_5 \rightarrow P_6 \rightarrow P_7 \rightarrow P_8 \rightarrow \ldots \rightarrow P_{12}$, then the input key 102e is pressed. In response, the processor 103 will decide that the partial path $P_{k1+1} \rightarrow \ldots \rightarrow P_{k2+1}(P_5 \rightarrow P_6 \rightarrow \ldots \rightarrow P_{12})$ is the machining area.

On the other hand, if the partial path to be machined is $P_{12} \rightarrow P_{13} \rightarrow \ldots \rightarrow P_5$, then the partial path display key 102f is pressed. In response to pressing the key 102f, the processor 103 reads $k_2(=11)$, reads position data indicative of the starting point $P_{k2+2}(=P_{13})$ of the $(k_2+2)$th block out of the RAM 106 and, as described earlier, applies this to the cursor pointer 105i to blink the cursor at the position of the point $P_{13}$ on the cathode-ray tube. If, under these conditions, the input key 102e is pressed, the processor 103 will decide that the partial path $P_{k_2+1} \rightarrow \ldots \rightarrow P_{k_1+1}(P_{12} \rightarrow \ldots \rightarrow P_5)$ is the machining area. FIG. 4 is a flowchart for the processing performed by the processor 103 of FIG. 2.

According to the present invention, a closed path trajectory comprising a number of path blocks is displayed on a display screen by using path data prepared beforehand. First and second points on the closed path are entered, and one of a point on a first path and a point on a second path which are connected to the first and second points, are indicated by a cursor. An area to be machined is specified by operating a machining area input switch when the point on the first path is being indicated by the cursor in a case where the first path is to be machined, and by operating the machining area input switch when the point on the second path is being indicated by the cursor in a case where the second path is to be machined. A partial machining area can therefore be entered reliably through a simple operation.

It is obvious from the foregoing that the present invention is useful for application to an apparatus for creating NC programs automatically.

We claim:

1. A machining area specifying method for an automatic programming system for specifying a partial path to be machined, the path being part of a closed path, said method comprising the steps of:
    (a) displaying a closed path trajectory comprising a number of path blocks on a display screen by using path data prepared beforehand;
    (b) obtaining starting point coordinates for each path block forming a part of the path trajectory based on the path data;
    (c) entering first and second points on the closed path by designating the points with a cursor, the first and second points being designated by displaying the cursor at the starting point of a designated path block by using the starting point coordinates;
    (d) designating by the cursor one of a first path and a second path which are connected to the first and second points; and
    (e) specifying an area to be machined by operating a machining area input switch when the first path is being designated by the cursor in a case where the first path is to be machined, and operating the machining area input switch when the second path is being designated by the cursor in a case where the second path is to be machined.

2. A machining area specifying method according to claim 1, wherein said step (c) further comprises:
    providing a first switch for cursor advance and a second switch for cursor back-up;
    advancing the cursor one path block at a time in a tool travelling direction each time the first switch is pressed; and
    backing up the cursor one path block at a time in a direction opposite to the tool travelling direction each time the second switch is pressed.

3. A machining area specifying method according to claim 2, wherein said step (c) further comprises:
    providing a switch for entering the starting point of a path block indicated by the cursor; and
    entering the first and second points by operating said switch.

4. A machining area specifying method according to claim 1, further comprising a step of displaying the designated first and second points in a manner to distinguish them from other points.

5. A machining area specifying method according to claim 1, further comprising a step of providing a switch for changing over a cursor display position between a point on the first path and a point on the second path.

6. An automatic method for specifying a machining path, comprising the steps of:
    (a) providing path blocks, including path data, for defining a closed path trajectory, each of the path blocks having starting point coordinates;
    (b) displaying the closed path trajectory based on the path blocks;
    (c) displaying the cursor at the starting point of a designated path block by using the starting point coordinates;
    (d) providing a first switch for cursor advance and a second switch for cursor back-up;
    (e) advancing the cursor one path block at a time in a tool travelling direction each time the first switch is pressed;
    (f) backing up the cursor one path block at a time in a direction opposite to the tool travelling direction each time the second switch is pressed;
    (g) designating first and second points on the closed path trajectory using the cursor, the first and second points defining the ends of first and second paths on the closed path trajectory; and
    (h) selecting one of the first and second paths as a path to be machined by generating a selection signal when the cursor is designating the selected one of the first and second paths, said step (h) including the substeps of:
        (h1) operating a machining area input switch while the first path is being designated by the cursor when the first path is to be machined; and
        (h2) operating the machining area input switch while the second path is being designated by the cursor when the second path is to be machined.

* * * * *

UNITED STATES PATENT AND TRADEMARK OFFICE
CERTIFICATE OF CORRECTION

PATENT NO. : 4,635,185

DATED : JANUARY 6, 1987

INVENTOR(S) : HAJIMU KISHI ET AL.

It is certified that error appears in the above-identified patent and that said Letters Patent is hereby corrected as shown below:

Col. 4, line 14, "the 102c" should be --the advance key 102c--;

line 15, delete "advance key".

Signed and Sealed this

Twenty-eighth Day of April, 1987

*Attest:*

DONALD J. QUIGG

*Attesting Officer*  *Commissioner of Patents and Trademarks*